May 13, 1924.

A. B. SMALL 1,493,826

TRANSMISSION GEARING

Filed Sept. 7, 1922

WITNESSES

INVENTOR
A.B. SMALL,

BY

ATTORNEYS

May 13, 1924.

A. B. SMALL 1,493,826

TRANSMISSION GEARING

Filed Sept. 7, 1922

WITNESSES

INVENTOR
A. B. Small,
BY
ATTORNEYS

Patented May 13, 1924.

1,493,826

UNITED STATES PATENT OFFICE.

ALFRED BOYD SMALL, OF MIAMI, FLORIDA.

TRANSMISSION GEARING.

Application filed September 7, 1922. Serial No. 586,674.

*To all whom it may concern:*

Be it known that I, ALFRED BOYD SMALL, a citizen of the United States, and a resident of Miami, in the county of Dade and State of Florida, have invented certain new and useful Improvements in Transmission Gearing, of which the following is a specification.

This invention relates to transmission gearing and the object of the invention is to produce a transmission gearing wherein a wide variation in the speed and power ratio may be had and in which the gearing is so constructed and organized that the gears are held at all times in proper mesh and engagement whereby noise and vibration is greatly reduced if not entirely eliminated and whereby the possibility of excessive and destructive strains being set up in the gear teeth or meshed portions of the gears are precluded, thus preventing stripping of the gears or grinding or excessive wear of the gear teeth, the gears being held at all times in their proper field of action and being constrained to efficiently transmit or receive motion as the case may be.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figures 5 and 6 are detail perspective views of certain of the shifting rods employed in the shifting mechanism.

Figure 1:
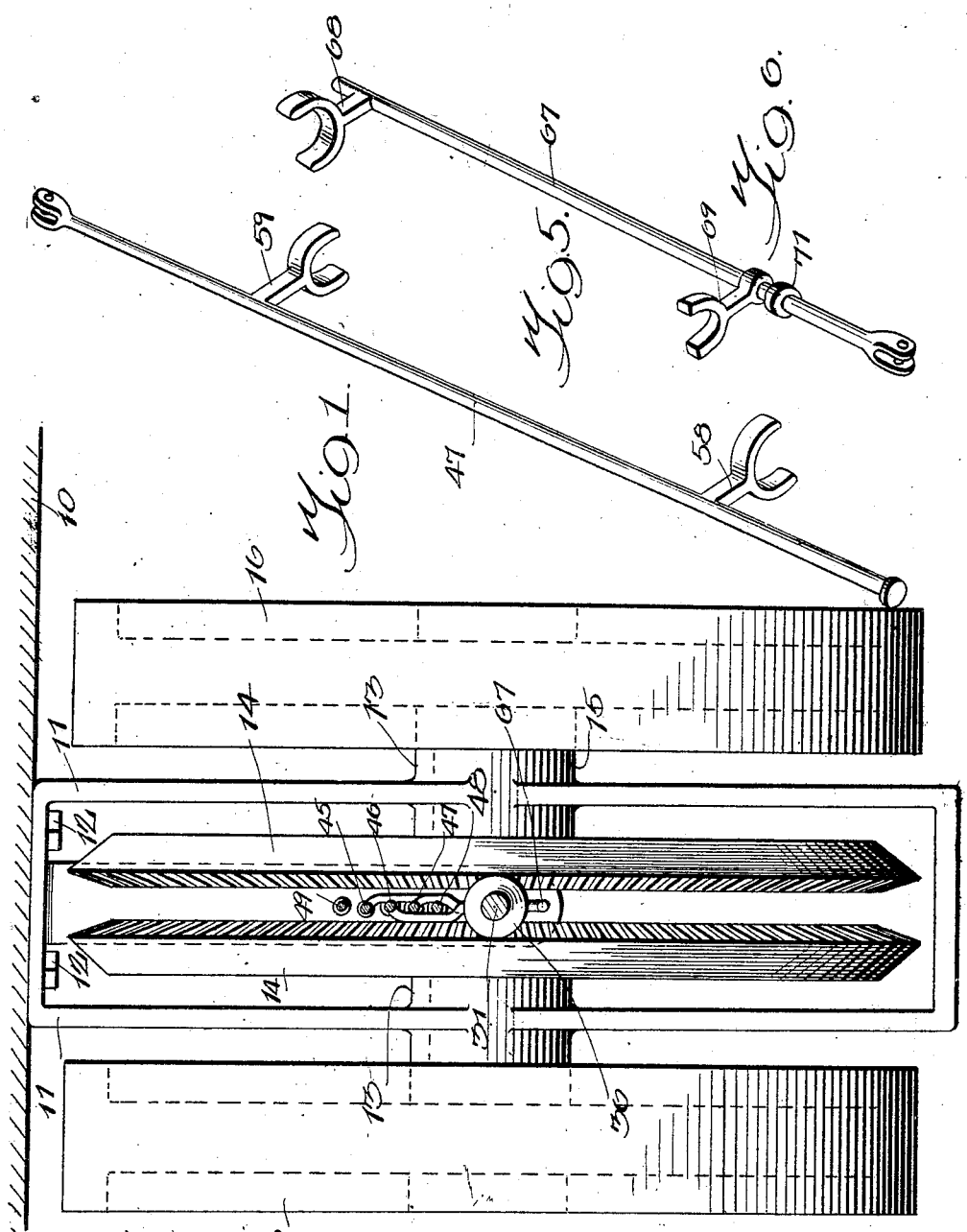
Figure 1 is a view in end elevation, showing the preferred embodiment of the invention and parts being shown in section for the sake of illustration.
Figure 2:
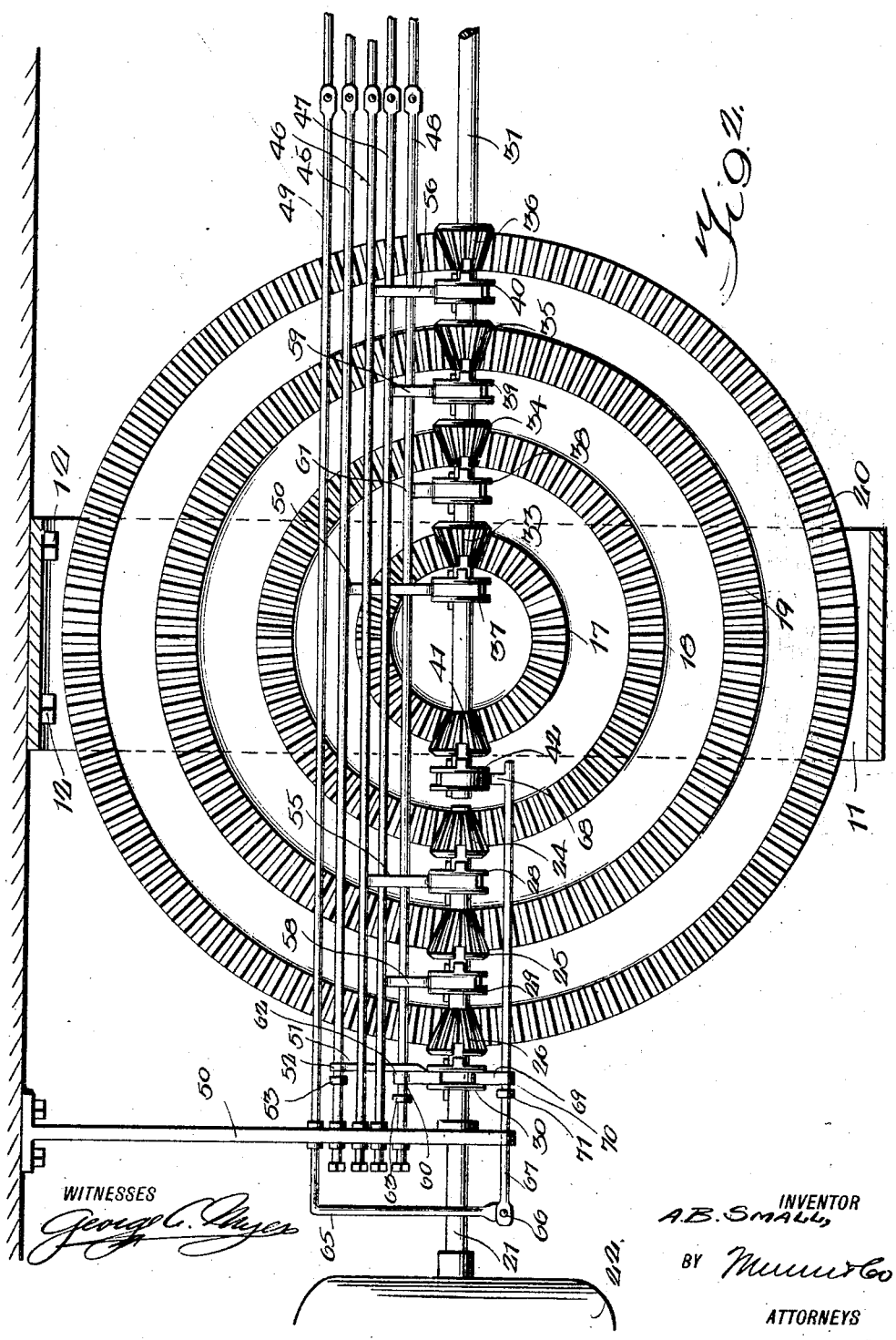
Figure 2 is a view in section on line 2—2 of Figure 1, parts being shown in elevation for the sake of illustration.
Figure 3:
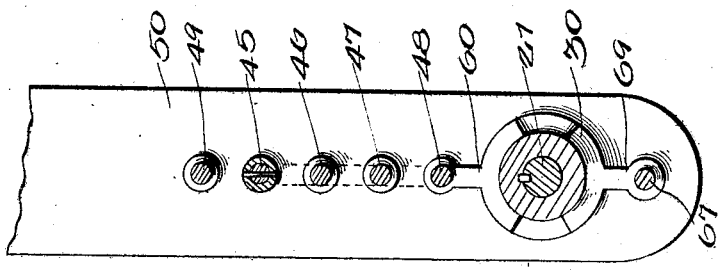
Figure 3 is a view in section, taken approximately on line 3—3 of Figure 2.
Figure 4:
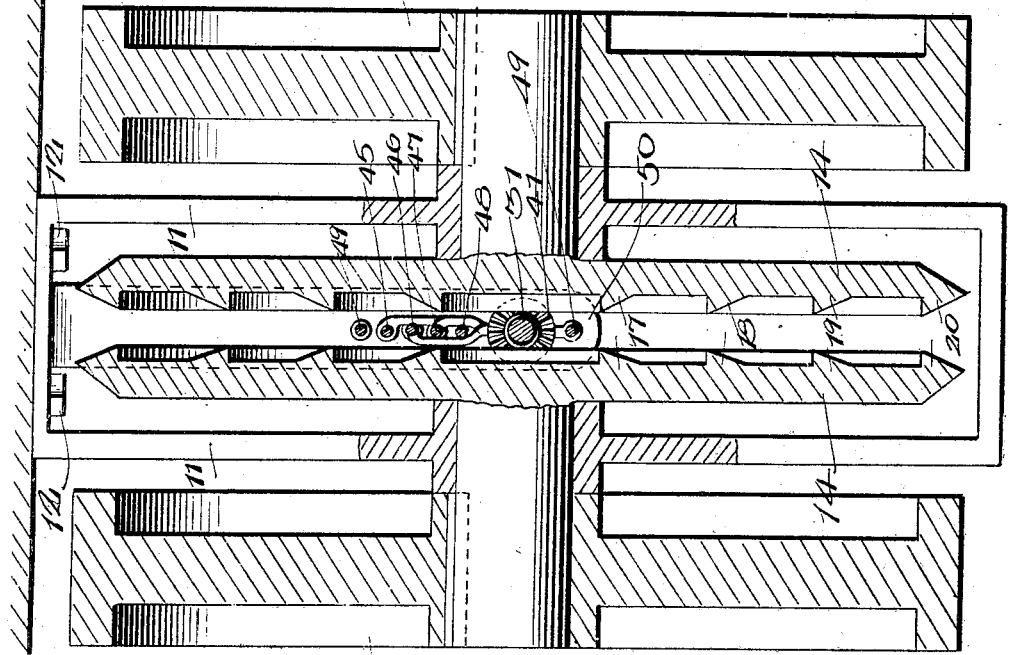
Figure 4 is a fragmentary detail view in section on line 4—4 of Figure 2.

Referring to the drawings, the numeral 10 designates a stationary supporting structure which may constitute a part of an automobile or the like although it is to be understood that the invention has universal utility and is not restricted in its application to motor vehicles. A hanger frame 11 is suspended, as at 12, from the stationary structure 10 and as shown in Figure 2 comprises a closed rectangular frame, the side bars of which have formed centrally thereof bearing collars or sleeves 13, the bearing collars or sleeves being spaced and being axially alined. A pair of disks, designated at 14, are provided and are arranged in spaced face to face relation, the disks having journals 15 rotatably mounted in the bearing collars 13 and carrying at their outer ends beyond the bearing collars fly wheels or balancing disks 16. If desired the bearing collars may be provided with circular bearing plates disposed to lie flush up against the outer faces of the disks 14 to maintain the disks in proper position, roller or ball bearings being interposed between the bearing plates and the outer faces of the disk 14 in order that the disks 14 may freely rotate around and on the thrust or bearing plates referred to.

The confronting faces of the disks 14 carry a plurality of concentrically disposed ring gears, four of such ring gears being shown for the sake of illustration and being designated at 17, 18, 19 and 20, respectively. These ring gears are shown as preferably comprising beveled gears integrally formed with the disk 14.

A drive shaft 21 actuated from an engine or power plant 22 extends transversely through the space between the disks 14 and across the faces of the disks, the drive shaft preferably extending radially of the disks 14 and terminating just beyond the inner circular edge of the ring gear 18. Beveled drive pinions 24, 25 and 26 are loosely mounted at spaced intervals on the drive shaft 21 and are respectively meshed with the ring gears 18, 19 and 20. These beveled drive pinions are free to rotate on the drive shaft 21 but are preferably held against longitudinal movement thereon and they are constantly in mesh with their respective ring gears and may be selectively constrained to rotate with the drive shaft 21 by means of slidable keys 28, 29 and 30 which may be of conventional construction and which selectively cooperate with the beveled pinions 24, 25 and 26 under the control of shifting mechanism to be hereinafter fully described.

A driven shaft 31 also extends transversely and preferably radially of the disks 14 and in the space between the disks. As shown in Figure 2 the driven shaft 31 is preferably alined with the drive shaft 21 and extends from adjacent the inner end of the drive shaft across the face of the disk. Beveled driven pinions 33, 34, 35 and 36 are loosely mounted on the driven shaft 31 so as to be free to rotate thereon while being held against longitudinal movement with respect thereto and are constantly meshed with the beveled ring gears 17, 18, 19 and 20 of the disks 14, the beveled driven pinions 32 to 36 inclusive being adapted to be selectively held or fixed to the shaft by means of slidable keys 37, 38, 39 and 40 cooperable with the pinions 33 to 36, respectively, the slidable keys being also controlled by shifting mechanism to be hereinafter described. The pinions 33 to 36 inclusive and their keys provide for the transmission of varied forward motion to the driven shaft 31 and in order to provide for the transmission of reverse motion to this shaft 31, a beveled pinion 41 is also loosely mounted on the shaft but is oppositely disposed with respect to the pinions 33 to 36 inclusive and is constantly in mesh with a portion of the ring gear 17 diametrically opposite to that portion of the ring gear engaged by the pinion 33. As in the instance of the other pinions the pinion 41 is free to rotate on the shaft 31 while constrained against longitudinal movement thereon but at the same time this pinion 41 may be held or fixed to the shaft 31 by virtue of a sliding key 42 operatively mounted on the shaft and adapted to be engaged with the pinion 41, the sliding key being controlled by a unit of the shifting mechanism to be presently described.

The shifting mechanism herein above referred to preferably comprises a plurality of shifting rods, designated at 45, 46, 47, 48 and 49 respectively and mounted for reciprocating or sliding movement in a suitable support 50, the shifting rod being adapted to be manually or electromagnetically controlled as desired.

The shifting rod 45 is shifted or actuated when it is desired that a low forward speed be imparted to the driven shaft 31 from the drive shaft and for this purpose the shifting rod 45 has fixed thereto a fork 50 having operative connection with the sliding key 37 of the driven pinion 33 and it also is associated with an arm 51 having an eye 52 loosely embracing the shifting rod the other end of the arm 52 being connected to the slidable key 30 of the driving pinion 36. A collar or annular abutment 53 is fixed to the shifting rod 45 adjacent the eye 52 and the arm 51 and this collar 53 engages the eye 52 and transmits motion from the shifting rod 45 to the arm 51 so that when the shifting rod 45 is manipulated or moved the pinions 26 and 33 will be clutched or fixed to the shafts 21 and 31, respectively.

At this time the drive pinion 26 drives or rotates the disks 14 since it meshes with the ring gears 20 of these disks and this motion of the disks is transmitted through the ring gears 17 and pinion 32 to the driven shaft 31.

High speed is obtained by shifting or moving the shifting rod 46, the other shifting rods being of course left in neutral position. In order that the shifting rod 46 may effect the high speed arrangement of the parts of the gearing it is provided with a shifting fork 55 operatively connected with the sliding key 28 of the drive pinion 24 and also with the shifting fork 56 operatively connected with the sliding key 40 of the driven pinion 36. When the shifting rod 46 is manipulated to throw the sliding keys 28 and 40 into engagement with the pinions 24 and 36, these pinions are clutched to the shafts 21 and 31, respectively, so that the motion of the driving shaft 21 is imparted to the disks 14 through the driving pinion 24 and ring gears 18 and this motion of the disks 14 is transmitted to the driven shaft 31 through the ring gears 20 and pinion 36.

Intermediate speeds and power ratio may be obtained by shifting the rods 47 and 48, the rod 47 having shifting forks 58 and 59 controlling the sliding keys 29 and 39 respectively, and the rod 48 having shifting forks 60 and 61 controlling the keys 30 and 38 respectively. It is to be noted however that the shifting fork 60 is not rigidly connected to the shifting rod 48 but that it includes a collar or eye 62 loosely mounted on the rod 48 and cooperable with an annular shoulder or collar 63 fixed to the rod 48 and engageable with the collar 62. It is only when the rod 48 is moved as so to engage the shoulder 63 with the collar 62 that the shifting fork 60 partakes of the motion of the rod 48, the shifting fork 60 and rod 48 being otherwise independent of each other.

The shifting rod 49 is manipulated or moved when it is desired to reverse the motion transmitted to the driven shaft, and for this purpose, an end of the rod 49 has integrally formed therewith or rigidly secured thereto an angular or downwardly extending arm 65 connected as at 66 with a selector rod 67. The selector rod has a fork 68 rigidly connected thereto and controlling the sliding key 42. A shifting fork 69 is also provided and is formed with a collar 70 loosely embracing the selector rod 67 and adapted to be engaged by an annular shoulder 71 fixed to the selector rod so that the movement of the selector rod in one direction is transmitted to the shifting fork 69 whereas the shifting fork 69 may be moved without transmitting its motion to the selector rod 67. When the rod 49 is manipulated or moved to throw the gear in reverse its motion is taken through the arm 65 and selector 67 to the keys 30 and 42, and these keys are moved into engagement with the pinions 26 and 41 respectively so as to clutch these pinions to their shafts 21 and 31 respectively and thus a low speed but highly powerful reverse motion is transmitted from the shaft 21 to the shaft 31.

It will thus be seen that with this arrangement and organization that the desired speed and power ratio may be obtained and at the same time the transmission by which these advantages are had is efficient, durable, reliable and noiseless in operation.

By providing the pair of disks in confronting spaced relation and arranging both the drive and driven pinions in the space between the disks and engaging these pinions with both the disks, all lateral thrust is balanced and equalized and the gear teeth of the pinions are properly alined and properly engaged with the gear teeth of the disks and all tendency of the pinions to ride out of engagement with the ring gears of the disks is prevented by the equalizing and balancing action of the two disks. Moreover the shifting mechanism shown in conjunction with this novel organization not only effectively carries out the desired shifting of the gears and the consequent variations in the speed and power ratio but also adapts itself to either manual or electromagnetic control. The particular mounting of the disks and the association of the balancing wheels or fly wheels therewith is thought to be a novel and important feature of the invention, as this feature contributes largely to the elimination of vibration and of noise.

I claim:

1. In a transmission gearing, a hanger frame having bearing sleeves therein, a pair of disks having journals rotatably mounted in the bearing sleeves, balancing wheels connected with the journals and rotatable therewith, said pair of disks being arranged in spaced and face to face relation and having ring gears on their confronting faces, driving pinions engaged with the ring gears of both disks and driven pinions also engaged with the ring gears of the disks.

2. A transmission gearing comprising a frame having bearing sleeves mounted therein, a pair of disks having journals rotatably mounted in the bearing sleeves, the disks being arranged in spaced and in face to face relation and having beveled ring gears on their confronting faces, a plurality of similar ring gears being provided on each disk and the rings being arranged concentric on each disk, a drive shaft extending radially of the space between the disks, and terminating short of the innermost ring gears drive pinions loosely mounted on the drive shaft and meshed with all of the ring gears of both disks except the innermost ring gears, slidable keys cooperable with the drive pinions, a driven shaft alined with the drive shaft and extending across all of the ring gears, driven pinions loosely mounted on the driven shaft, and meshed with all the ring gears of both disks, one of the driven pinions being oppositely arranged with respect to the other driven pinions and being engaged with the innermost ring gears, slidable keys cooperable with the driven pinions and shifting mechanism coacting with the slidable keys for selectively clutching the desired drive and driven pinions to the drive and driven shaft respectively.

3. In a transmission gearing, a pair of gears arranged in spaced and face to face relation and having their confronting faces provided with ring gears, a drive shaft having a portion disposed in the space between the disks, a driven shaft also having a portion disposed in the space between the disks, drive pinions loosely mounted on the drive shaft and engaged with the ring gears of both disks driven pinions mounted on the driven shaft and also engaged with the ring gears of both disks, slidable keys cooperable with the drive pinions, slidable keys cooperable with the driven pinions and shifting mechanism cooperable with the slidable keys for selectively clutching the drive pinions and the driven pinions to the drive and driven shafts respectively, said shifting mechanism including a plurality of shifting rods, and forks connecting the shifting rods with the slidable keys, certain of said forks being fixed to the shifting rods and other of said forks having eyes loosely embracing said shifting rods, said shifting rods having annular abutments engageable with the eyes whereby motion in one direction is transmitted from the shifting rod to the eye and consequently to the fork whereas the fork and its eye may move without imparting motion to the shifting rod upon which it is mounted.

ALFRED BOYD SMALL.